(12) United States Patent
Takami (10) Patent No.: US 6,667,858 B2
(45) Date of Patent: Dec. 23, 2003

(54) MAGNETIC RECORDING/READING APPARATUS

(75) Inventor: Hiromichi Takami, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 234 days.

(21) Appl. No.: 09/794,047

(22) Filed: Feb. 28, 2001

(65) Prior Publication Data

US 2001/0040769 A1 Nov. 15, 2001

(30) Foreign Application Priority Data

Apr. 14, 2000 (JP) ...................................... 2000-113876

(51) Int. Cl.$^7$ ................................................. G11B 5/54
(52) U.S. Cl. ................................................. 360/254.7
(58) Field of Search .......................... 360/254.2, 254.3, 360/254.7, 254.8

(56) References Cited

U.S. PATENT DOCUMENTS

| | | | | |
|---|---|---|---|---|
| 5,148,339 A | * | 9/1992 | Yoshida .................. | 360/254.7 |
| 5,543,986 A | | 8/1996 | Albrecht .................. | 360/255 |
| 5,581,424 A | | 12/1996 | Dunfield et al. .......... | 360/265.2 |
| 5,585,980 A | * | 12/1996 | Boutaghou ............... | 360/255 |
| 5,831,795 A | * | 11/1998 | Ma et al. ................. | 360/254.3 |
| 5,864,444 A | * | 1/1999 | Baker et al. .............. | 360/265.9 |
| 6,091,576 A | * | 7/2000 | Eckerd et al. ............ | 360/254.8 |
| 6,160,686 A | * | 12/2000 | Albrecht et al. .......... | 360/255.6 |
| 6,181,528 B1 | * | 1/2001 | Reinhart et al. .......... | 360/254.7 |
| 6,201,665 B1 | * | 3/2001 | Angellotti et al. ........ | 360/255.7 |
| 6,424,501 B1 | * | 7/2002 | Tsujino et al. ........... | 360/254.7 |
| 6,487,051 B1 | * | 11/2002 | Koyanagi et al. ......... | 360/254.8 |

FOREIGN PATENT DOCUMENTS

JP 10-302421 11/1998

* cited by examiner

Primary Examiner—Jefferson Evans
(74) Attorney, Agent, or Firm—Finnegan, Henderson, Farabow, Garrett & Dunner, L.L.P.

(57) ABSTRACT

Disclosed is a magnetic recording/reading apparatus comprising a ramp formed of a material having at least 30% of a tensile elongation as defined by ASTM D638. The distance c, which is defined as the length between a ramp and a tab measured at the point a/3 apart from the contact portion, a being the contact width of the ramp and the tab, is 0.0015a, or at least 0.015 $\mu$m where a is 10 to 50 $\mu$m.

9 Claims, 8 Drawing Sheets

MAGNETIC RECORDING/READING APPARATUS

CROSS-REFERENCE TO RELATED APPLICATIONS

This application is based upon and claims the benefit of priority from the prior Japanese Patent Application No. 2000-113876, filed Apr. 14, 2000, the entire contents of which are incorporated herein by reference.

BACKGROUND OF THE INVENTION

The present invention relates to a load/unload type magnetic recording/reading apparatus.

In a load/unload type magnetic recording/reading apparatus, a member called ramp is arranged as a head shunting mechanism on the outside of a portion where a magnetic recording media is arranged in order to permit the head to be shunted outside the magnetic recording media during the non-recording/reading period. During the recording/reading period, the head can be moved from the ramp onto the magnetic recording media.

The head is mounted on a head supporting member, e.g., a suspension assembly using a leaf spring, and a projection called tab is mounted to the tip of the suspension assembly. The tab is disposed on and is slidable along the ramp.

Also, the ramp is designed such that, during the non-recording/reading period, the tab can be disposed stably on the ramp, and that, during the recording/reading period, the tab is easily capable of sliding along the ramp so as for the head to move onto the magnetic recording media. A resin is used mainly as a material of the ramp.

However, if the tab slides along the ramp made of a resin, the resin is peeled so as to generate an abrasion powder, with the result that the abrasion powder drops onto the surface of the magnetic recording media. The abrasion powder dropping on the surface of the magnetic recording media generates problems that a head crashed to the media and that the recording/reading operation is obstructed.

For preventing from generating such an abrasion powder, it was disclosed a ramp including a resin film containing solid lubricating fine particles, coated on a contact surface where a tub may come contact with the ramp in Jpn. Pat. Appln. KOKAI Publication No. 5-198113. However, such ramp was not satisfied to prevent from a generation of the abrasion powder.

BRIEF SUMMARY OF THE INVENTION

An object of the present invention, which has been achieved in view of the situation described above, is to provide a magnetic recording/reading apparatus, in which the head supporting member can be disposed stably on the ramp during the non-recording/reading period, the contact portion between the head supporting member and the ramp can be slid easily so as to permit the head supporting member to be moved onto the magnetic recording media, and an abrasion powder is not generated during the sliding.

Firstly according to the present invention there is provided that a magnetic recording/reading apparatus comprising: a magnetic recording media; a head having a recording/reading element configured to record and read information in and from the magnetic recording media mounted thereon; and a ramp made of a material having at least 30% of a tensile elongation defined in ASTM D638, permitting the head to be shunted outside the magnetic recording media during the non-recording/reading period.

Secondly according to the present invention there is provided that a magnetic recording/reading apparatus comprising: a magnetic recording media; a head having a recording/reading element configured to record and read information in and from the magnetic recording media mounted thereon; and a suspension assembly configured to support the head, a ramp positioned outside of the magnetic recording media, being contact with a part of the suspension assembly to slidably support the suspension assembly and permit the head to be shunted outside the magnetic recording media during the non-recording/reading period wherein the ramp is made of a material having at least 30% of a tensile elongation defined in ASTM D638, and the relationship represented by formulas(1) and (2) given below is satisfied:

$$b=a/3 \qquad (1)$$

$$c \geq 0.0015a \qquad (2)$$

where a represents a contact width of the contact portion between the ramp and a part of the suspension assembly as viewed from a cross section perpendicular to sliding direction of the suspension assembly, and c represents the distance in a vertical direction between a portion on a part of the suspension assembly apart from the edge of the contact portion by distance b and the surface of the ramp.

Thirdly according to the present invention there is provided that a magnetic recording/reading apparatus comprising: a magnetic recording media; a head having a recording/reading element configured to record and read information in and from the magnetic recording media mounted thereon; and a suspension assembly configured to support the head, a ramp positioned outside of the magnetic recording media, being contact with a part of the suspension assembly to slidably support the suspension assembly and permit the head to be shunted outside the magnetic recording media during the non-recording/reading period wherein the ramp is made of a material having at least 30% of a tensile elongation defined in ASTM D638, and the relationship represented by formulas(1) given below is satisfied:

$$b=a/3 \qquad (1)$$

where a represents a contact width of the contact portion between the ramp and a part of the suspension assembly as viewed from a cross section perpendicular to sliding direction of the suspension assembly, and falls within a range of between 10 and 50 $\mu$m, and c represents the distance in a vertical direction between a portion on a part of the suspension assembly apart from the edge of the contact portion by distance b and the surface of the ramp, and is not smaller than 0.015 $\mu$m.

In the magnetic recording/reading apparatus of the present invention, the head supporting member can be disposed stably on the ramp during the non-recording/reading period, the contact portion between the head supporting member and the ramp can be slid easily so as to permit the head supporting member to be moved onto the magnetic recording media, and an abrasion powder is not generated by the sliding.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention provides a so-called "load/unload" type magnetic recording/reading apparatus, comprising a head having a recording/reading element configured to record and read information in and from a magnetic recording media and a ramp configured to bring the head out of the magnetic recording media during the non-recording/reading period, wherein the ramp is formed of a material having at least 30% of a tensile elongation defined in ASTM D638.

The tensile elongation is related to malleability. Specifically, a material having a large tensile elongation exhibits a large malleability. When a material having a large malleability receives a pressure, the breakage between the molecules and between the atoms of the material is unlikely to take place, though the arrangement of the molecules and the atoms of the material is certainly changed, with the result that the material is not broken but is elongated thin.

The ramp used in the present invention has a large malleability. Therefore, when the contact portion between the head supporting section and the ramp is mutually slid, the material in the contact portion is released appropriately into the non-contact portion so as to be deformed, with the result that deformed part are generated around he contact portion. It follows that the resin is unlikely to be peeled off the ramp so as to prevent generation of an abrasion powder.

It is desirable for the tensile elongation to be not higher than 100%. If the tensile elongation exceeds 100%, a practical inconvenience tends to be generated in the holding and sliding of the head supporting member. Also, where the ramp is fixed by, for example, a screw, the screw tends to be loosened.

Figure 1:
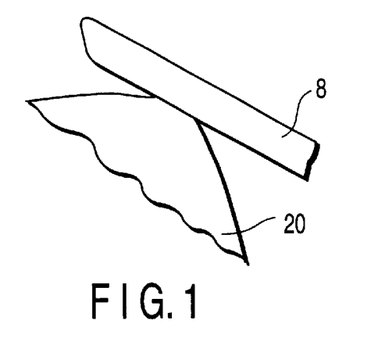
FIG. 1 shows as a model the state of the contact portion of a ramp of the present invention.
Figure 2:
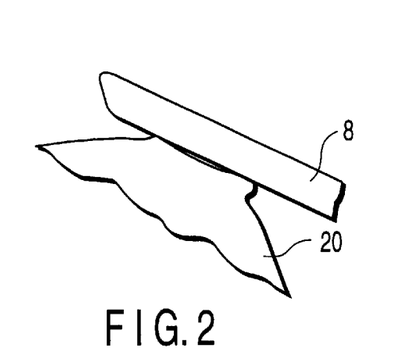
FIG. 2 shows as a model the state of the contact portion of a ramp of the present invention.
Figure 3:
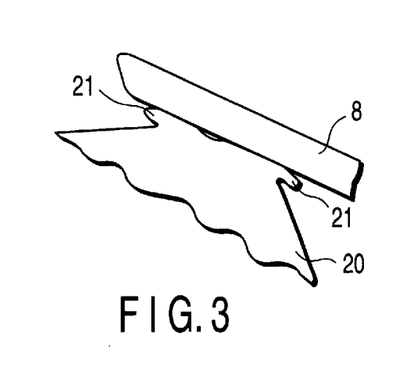
FIG. 3 shows as a model the state of the contact portion of a ramp of the present invention.
Figure 4:
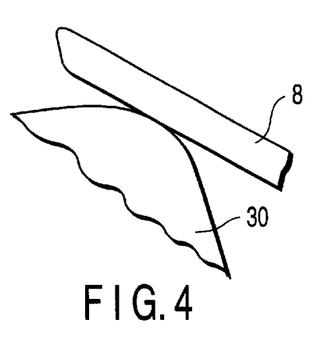
FIG. 4 shows as a model the state of the contact portion of a ramp of a comparative case.
Figure 5:
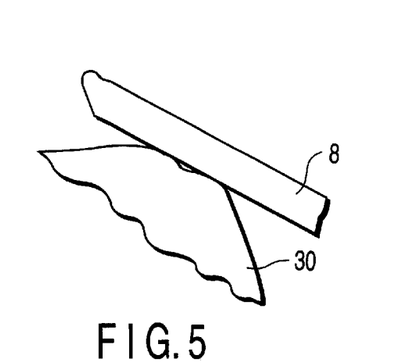
FIG. 5 shows as a model the state of the contact portion of a ramp of a comparative case.
Figure 6:
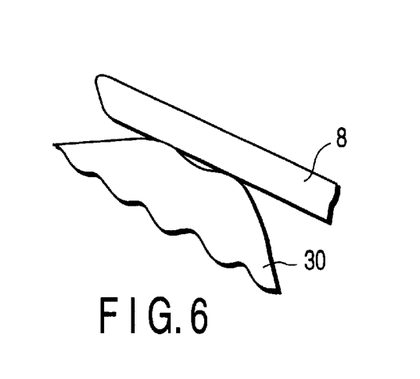
FIG. 6 shows as a model the state of the contact portion of a ramp of a comparative case.

Each of FIGS. 1 to 3 shows as a model the projection mounted to the tip of a head supporting member and the state of the contact portion of a ramp made of a material having a large malleability. On the other hand, each of FIGS. 4 to 6 shows as a model the projection and the state of the contact portion of the ramp of a comparative case made of a material having a small malleability. Each of FIGS. 1 and 4 shows the state of the contact portion in the initial stage of the sliding. Each of FIGS. 2 and 5 shows the state of the contact portion in the middle stage of the sliding. Further, each of FIGS. 3 and 6 shows the state of the contact portion in the final stage of the sliding.

As shown in FIGS. 1 to 3, in the case of the ramp made of a material having a large malleability, the contact portion between the projection 8 formed at the tip of the head supporting member and the ramp 20 made of a material having a large malleability is not finely broken but is released around the contact portion, even if the sliding between the projection 8 and the ramp 20 is repeated, so as to be gradually deformed while forming a deformed part 21. Also, the planar tension is lowered by the deformation, with the result that the contact portion is unlikely to be abraded.

On the other hand, in the case of using the ramp made of a material having a small malleability, the material of the contact portion between the projection 8 formed at the tip of the head supporting member and the ramp 30 is destructed so as to be peeled off the ramp 30, if the sliding between the projection 8 and the ramp 30 is repeated, with the result that an abrasion powder drops onto the magnetic recording material, as apparent from FIGS. 4 to 6.

Incidentally, FIGS. 1 to 6 collectively show as a model the contact state between a curved surface at a part of the ramp and a substantially planar portion on the surface of the projection. However, the shapes of the ramp and the projection in the contact portion are not particularly limited in the present invention. For example, it is possible for the contact portion of the ramp to be planar and for the projection to be curved.

The materials that can be used preferably in the present invention for forming the ramp include, for example, polyacetal, polyamide, polycarbonate, polybutylene terephthalate, and polyphenylene oxide.

These materials permit a collective molding so as to facilitate the ramp formation. Particularly, it is desirable to use polyacetal for forming the ramp, because polyacetal exhibits a good mold transfer capability, permits obtaining a smooth surface, and is excellent in its resistance to abrasion.

The polyacetal resin includes a homopolymer represented by chemical formula (1) given below and a copolymer represented by chemical formula (2) given below:

R in each of chemical formulas (1) and (2) given above represents, for example, a hydrogen atom, a methyl group, an ethyl group, etc.

In order to improve the sliding characteristics, it is possible to add various lubricating components to the ramp material described above. The lubricating components used in the present invention include, for example, polytetrafluoroethylene, polyvinylidene fluoride, perfluoro polyether, phosphasen-series lubricating oil, waxes such as carnauba wax and polyethylene wax, and metal soaps.

In order to prevent a deviation in size, the supporting section of the ramp can be formed of a metal. It is also possible to add carbon to the ramp material in order to prevent generation of the static electricity.

According to a first preferred embodiment of the present invention, there is provided a magnetic recording/reading apparatus, comprising a magnetic recording media, a head having a recording/reading element configured to record and read information in and from the magnetic recording media mounted thereon, a suspension assembly for supporting the head, and a ramp in contact with a part of the suspension assembly and slidably supports the suspension assembly, wherein the ramp is formed of a material having at least 30% of a tensile elongation defined in ASTM D638, and the relationship represented by formulas (1) and (2) given below is satisfied:

$$b = a/3 \qquad (1)$$

$$c \geq 0.0015a \qquad (2)$$

where a represents a contact width of the contact portion between the ramp and a part of the suspension assembly as viewed from a cross section perpendicular to the sliding direction of the suspension assembly, and c represents the distance in a vertical direction between a position on a part of the suspension assembly apart from the edge of the contact portion by distance b and the surface of the ramp.

According to a second preferred embodiment of the present invention, there is provided a magnetic recording/reading apparatus, wherein the contact width a in the first preferred embodiment described above is 10 to 50 $\mu$m, the distance c in the first preferred embodiment is at least 0.015 $\mu$m, and the distance b in the first preferred embodiment meets formula (1) given below:

$$b = a/3 \qquad (1).$$

In the second preferred embodiment of the present invention, it is desirable for the distance c to meet formula (3) given below:

$$c \leq 0.1a \qquad (3)$$

If the distance c exceeds 0.1a, the curvature radius in the contact portion of the ramp is diminished so as to decrease the area of the contact portion. As a result, the contact pressure is increased so as to tend to promote abrasion.

In the present invention according to the first and second embodiments described above, defined is the surface shape of the ramp in contact with a part of the suspension assembly, which is a head supporting member.

Figure 7:
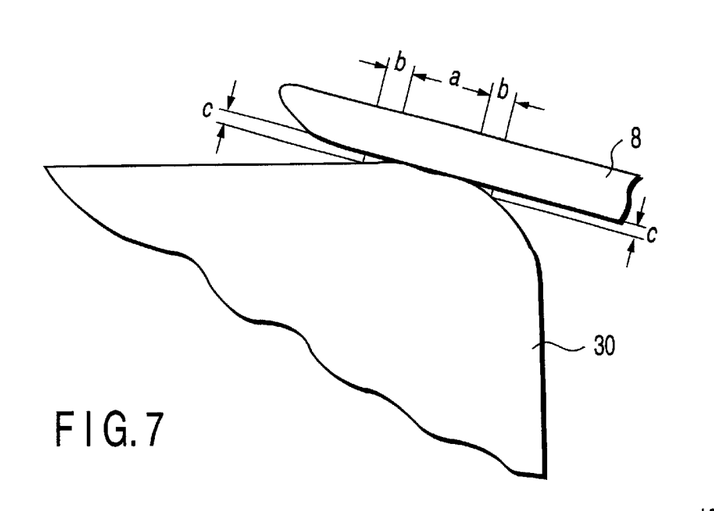
FIG. 7 shows specifically the measuring section for defining the surface shape of a ramp used in the present invention.

FIG. 7 specifically shows the contact width a, the distance b, and the distance c for defining the surface shape of the ramp in the first and second preferred embodiments of the present invention.

If the distance c between a part 8 of the suspension assembly around the contact portion and an edge 30 of the ramp is unduly small in forming the deformed part as shown in FIG. 3, the resin tends to become unduly long so as to be cut away easily. Therefore, it is desirable for the length of the resin piece to be not larger than ⅓ of the contact width a.

Such being the situation, in the present invention according to the first and second preferred embodiments, the distance c, as viewed from a cross section perpendicular to the sliding direction of the suspension assembly, is set sufficiently large between a part 8 of the suspension assembly at the distance b, which is ⅓ of the contact width a and the ramp 30, as shown in the drawing. As a result, the formation of the deformed part as shown in FIG. 3 can be performed efficiently, and it is possible to suppress easily the length of the deformed part thus formed at ⅓ or less of the contact width a so as to prevent the generation of the abrasion powder caused by the destruction of the resin.

The present inventors have experimentally repeated the sliding, finding that the resin having a thickness of at least about a/1000 is moved into the side of the contact portion.

In the cross sectional view shown in FIG. 7, the amount of the moved resin, if calculated as a cross sectional area, is at least a/2×a/1000×½. In this case, the shape of the area is close to a triangular shape. In order to suppress the length of the deformed part at a/3, formula (4) given below must be established:

$$a/2 \times a/1000 \times \tfrac{1}{2} \leq a/3 \times c \times \tfrac{1}{2} \qquad (4)$$

Formula (4) indicates that the distance c between a part 8 of the suspension assembly and the ramp 30 must meet formula (2) given below:

$$c \geq 0.0015a \qquad (2)$$

Also, in the second preferred embodiment of the present invention, a magnetic disc having a diameter of 2 to 15 cm is used particularly desirably.

When it comes to a magnetic disc having such a large diameter, the distance of the contact portion should desirably be 10 to 50 $\mu$m. If the distance is less than 10 $\mu$m, the contact pressure is rendered excessively high so as to cause abrasion. On the other hand, if the distance exceeds 50 μm, the sliding resistance is rendered excessively large.

Under the circumstances, in the second preferred embodiment of the present invention, the distance c should be at least 0.015 μm on the basis of formula (2).

Also, it is desirable for the distance c not to exceed 5 μm on the basis of formula (3).

In the first and second preferred embodiments of the present invention, a material having at least 30% of the tensile elongation defined in ASTM D638, which is defined in the first preferred embodiment of the present invention, is used for forming the ramp.

Figure 8:
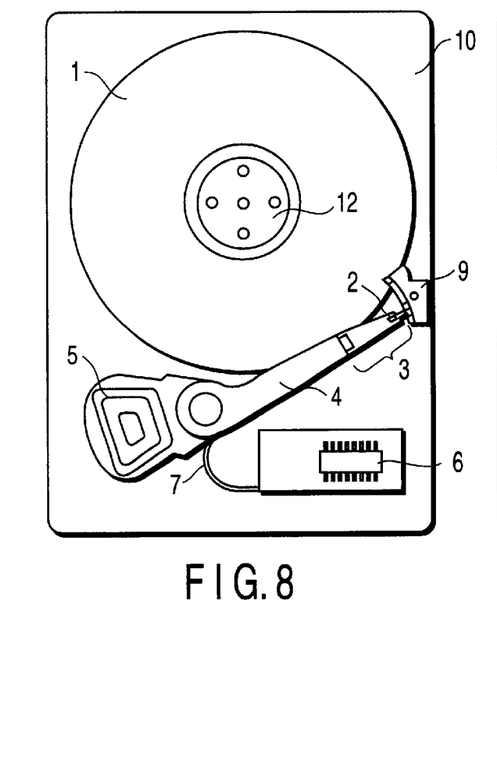
FIG. 8 shows as an example a magnetic recording/reading apparatus of the present invention.
Figure 9:
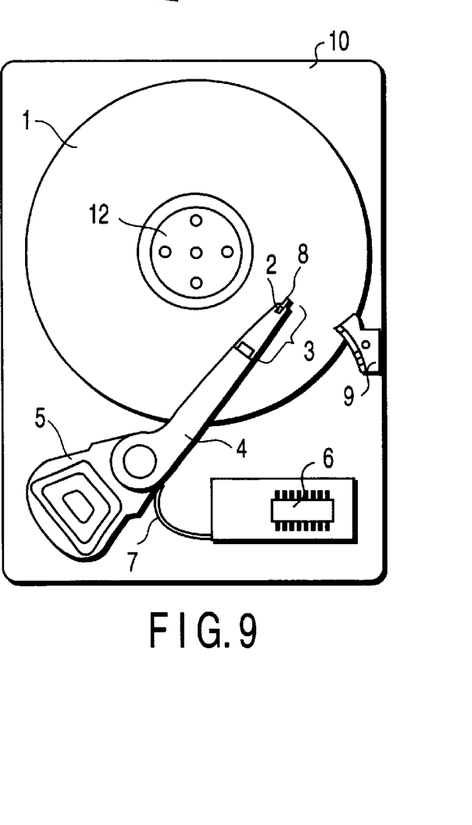
FIG. 9 shows as an example a magnetic recording/reading apparatus of the present invention.

FIGS. 8 and 9 collectively show schematically an example of a magnetic recording/reading apparatus of the present invention. Specifically, FIG. 8 shows the state that the head is shunted (unloaded) in the non-recording/reading period in the ramp arranged outside the magnetic recording media. On the other hand, FIG. 9 shows the state that the head is loaded from the ramp onto the magnetic recording media.

As shown in these drawings, the magnetic recording/reading apparatus of the present invention comprises an apparatus body 10. A magnetic disc 1 for recording information, which has a rigid structure (disc thickness/disc outer diameter>1/500) is mounted to a spindle 12 on the apparatus body 10. The magnetic disc 1 thus mounted is rotated at a predetermined rotating speed by a spindle motor (not shown). In a suspension assembly 3 having a magnetic head 2, which makes access to the magnetic disc 1 for recording/reading information, mounted thereon, the magnetic head 2 is mounted to a tip region of the suspension formed of a thin plate-like leaf spring, and a projection-shaped tab 8 is mounted to the tip of the suspension. A ramp 9, which is brought into contact with the tab 8 during the non-recording/reading period for supporting the tab 8 thereon and which permits the tab 8 to be slid and moved onto the magnetic disc 1 during the recording period, is arranged below the tab 8. Also, the other end of the suspension assembly 3 is connected to the end at one side of an arm 4 provided with, for example, a bobbin for holding a driving coil (not shown).

A voice coil motor 5, which is a kind of a linear motor, is arranged at the end on the other side of the arm 4. The voice coil motor 5 comprises a driving coil (not shown) wound about the bobbin portion of the arm 4, and a magnetic circuit consisting of a permanent magnet arranged to face the driving coil and to have the driving coil held therein and a yoke arranged to face the permanent magnet.

The arm 4 is held by ball bearings (not shown) arranged at upper and lower portions of a fixing shaft, and is rotated and rocked by the voice coil motor 5.

In other words, the position of the suspension assembly 3 on the magnetic disc 1 is controlled by the voice coil motor 5.

The voice coil motor 5 is controlled by a driving circuit 6 connected to the voice coil motor 5 by a flexible wiring 7 so as to be loaded on the magnetic disc 1 as shown in FIG. 9 and unloaded from the magnetic disc 1 as shown in FIG. 8.

The present invention will now be described in detail with reference to an example.

EXAMPLE 1

A ramp 9 was integrally prepared by molding of polyacetal having a basic skeletal structure shown in chemical formula (3) given below and, then, mounted to a magnetic recording/reading apparatus constructed as shown in FIGS. 7 and 8:

The tensile elongation of the polyacetal measured in accordance with ASTM D638 was found to be 50%.

The tensile elongation was measured as follows. Specifically, a dumbbell-shaped sample piece was left to stand under a temperature of 23±2° C. and a relative humidity of 50±5% for at least 40 hours and, then, the both ends of the sample piece were clamped by tools and the sample piece was pulled under a temperature condition of 23±2° C. When it comes to a sample piece reaching a yield point, the elongation to the yield point was measured, and the percentage of the elongation relative to the original length of the sample piece was calculated so as to determine the tensile elongation. On the other hand, when it comes to a sample piece reaching a breaking point, the elongation to the breaking point was measured, and the percentage of the elongation relative to the original length of the sample piece was calculated so as to determine the tensile elongation.

Also, in the contact portion between the ramp and the tab, the contact width a was found to be 20 μm, the distance c was found to be 0.6 μm, namely 0.03a.

A sliding test was conducted by carrying out 50,000 times of the loading/unloading operations by using the magnetic recording/reading apparatus thus prepared.

Figure 10:
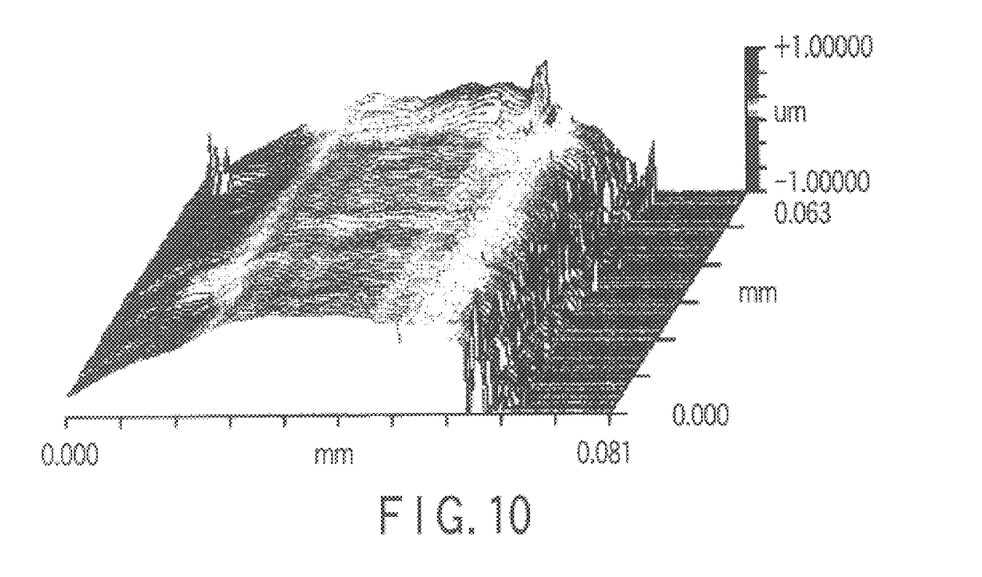
FIG. 10 shows image data displayed on a display and representing a three dimensional shape of a ramp contact portion used in the present invention.
Figure 11:
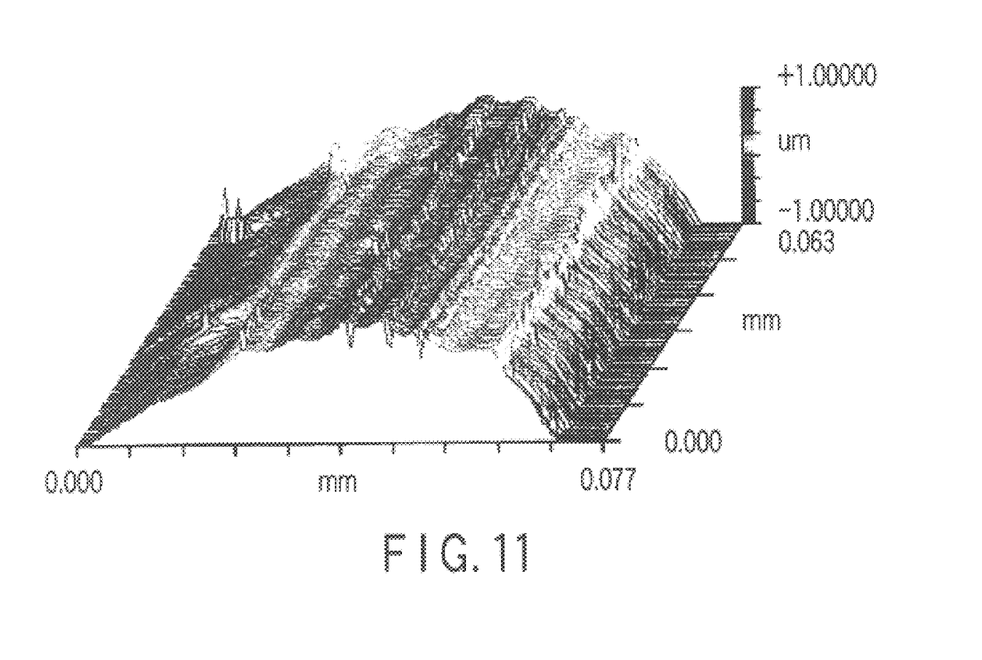
FIG. 11 shows image data displayed on a display and representing a three dimensional shape of a ramp contact portion used in the present invention.

A three dimensional shape of the ramp contact portion was measured both before the sliding test and after the test of 50,000 times of the loading/unloading operations by using a three dimensional shape measuring apparatus. FIGS. 10 and 11 show the results. Also, FIG. 12 shows the image prepared by subtracting the three dimensional shape after 50,000 times of the sliding test from the three dimensional shape before the sliding test.

Figure 12:
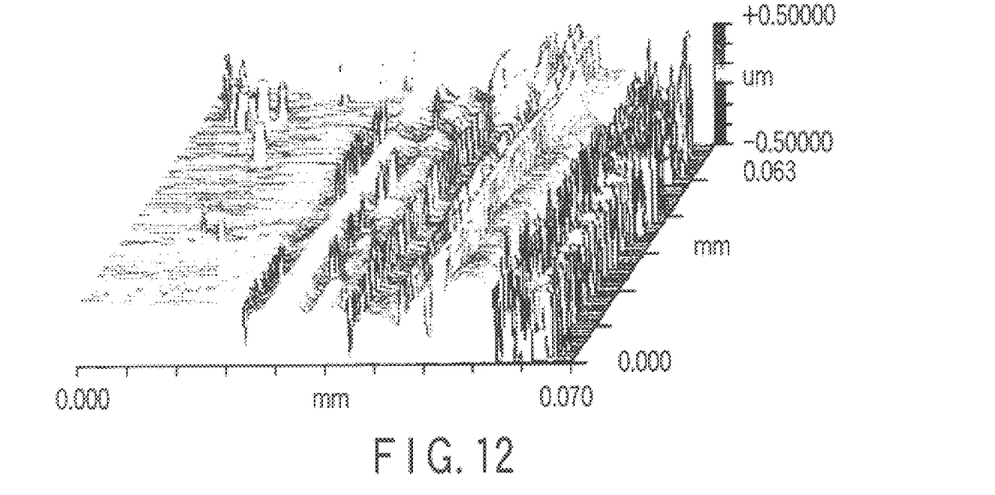
FIG. 12 shows image data displayed on a display and representing the difference in the three dimensional shape between the image data shown in FIG. 11 and the image data shown in FIG. 10.
Figure 13:
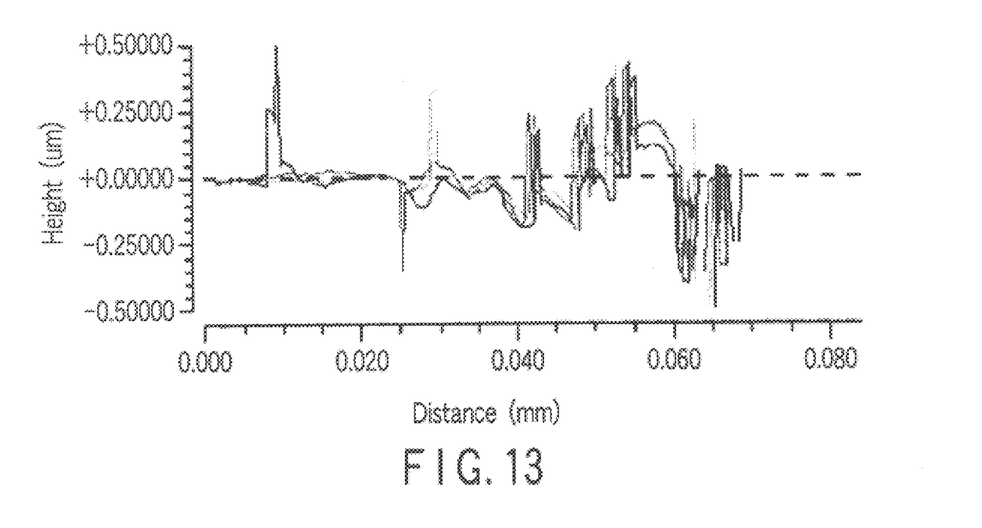
FIG. 13 shows the image data displayed on a display and representing a cross section of the image data shown in FIG. 12.

In FIGS. 10 to 12, the right end corresponds to the edge of the ramp. As shown in FIGS. 10 and 11, deformation has been found to take place in the contact portion and around the contact portion after 50,000 times of the sliding test. Also, in FIGS. 13 and 14, the decreased portions by the movement of the resin are denoted by projections or positive numerals, and the increased portions are denoted by recesses or negative numerals. It has been found that, since the decreased amount is substantially equal to the increased amount, the resin was scarcely peeled off the ramp after the sliding test.

Further, the abrasion powder in the outer circumferential portion of the disc and the abrasion powder on the tab were observed with a microscope both before the sliding test and after 400,000 times of the sliding test. Table 1 shows the results. The results of the test were evaluated as follows:

○: The abrasion powder was recognized only slightly or not recognized at all;

Δ: The abrasion powder was recognized to some extent;

X: The abrasion powder was recognized in a large amount.

As apparent from Table 1, the abrasion power was not recognized in any of these cases.

Comparative Example 1

A three dimensional shape was measured as in Example 1, except that an aliphatic polyketone having 26% of a tensile elongation as measured in accordance with ASTM D638 was used as the material of the ramp. FIGS. 14 to 17 show the results.

Figure 14:
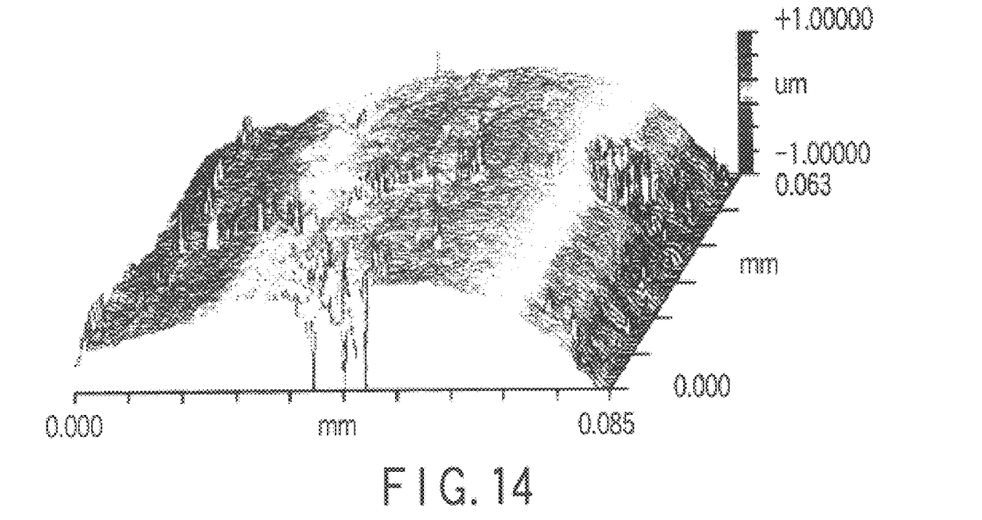
FIG. 14 shows the image data displayed on a display and representing the three dimensional shape of the contact portion of a ramp for a comparative case.
Figure 15:
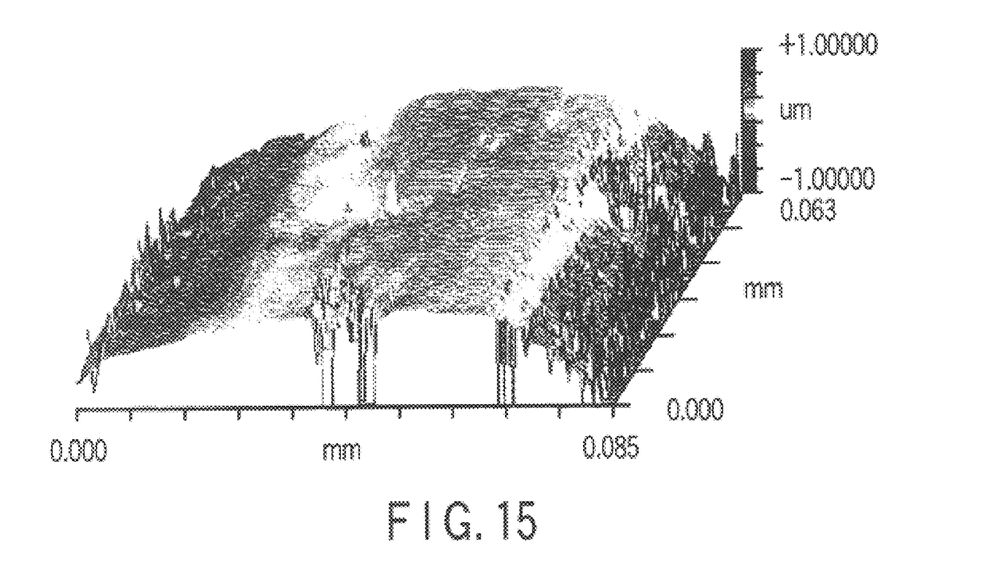
FIG. 15 shows the image data displayed on a display and representing the three dimensional shape of the contact portion of a ramp for a comparative case.

As shown in FIGS. 14 and 15, it has been found that deformation was generated in, particularly, the contact portion after 50,000 times of the sliding test.

Figure 16:
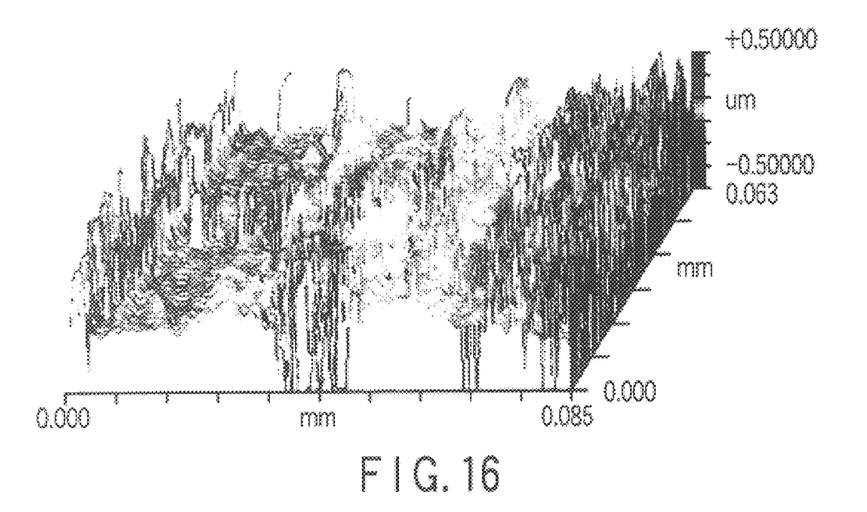
FIG. 16 shows the image data displayed on a display and representing the difference in the three dimensional shape between the image data shown in FIG. 14 and the image data shown in FIG. 15.
Figure 17:
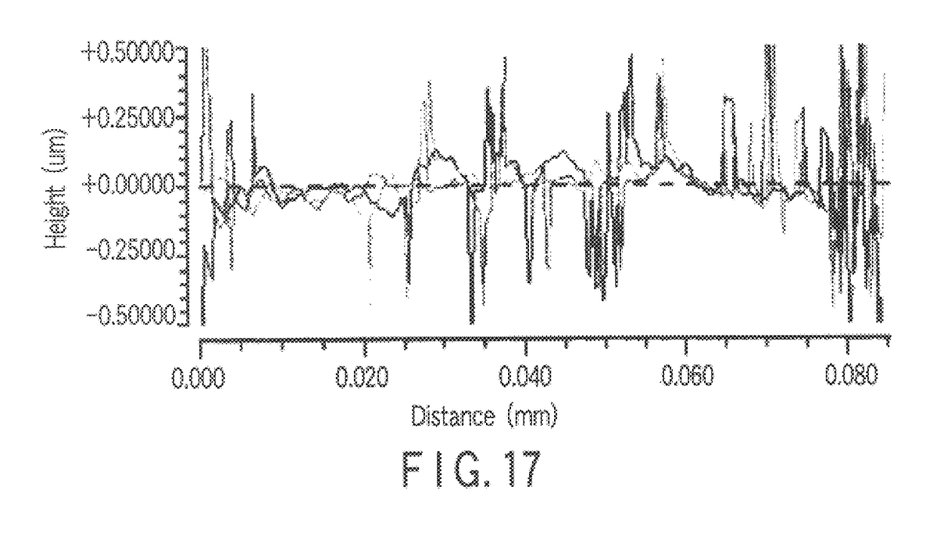
FIG. 17 shows the image data displayed on a display and representing a cross section of the image data shown in FIG. 16.

Also, as shown in FIGS. 16 and 17, the decreased amount was found to be larger than the increased amount, supporting that one part of the resin was peeled off the ramp after the sliding test.

Further, the abrasion powder in the outer circumferential portion of the disc and the abrasion powder on the tab were observed with a microscope after 400,000 times of the sliding test, as in Example 1. As a result, the abrasion powder was not recognized on the tab, though the abrasion powder was recognized in the outer circumferential portion of the disc. Table 1 shows the results.

Comparative Example 2

A three dimensional shape was measured as in Example 1, except that a liquid crystal polymer, to which was added PTFE (polytetrafluoroethylene), having 4.5% of a tensile elongation as measured in accordance with ASTM D638 was used as the material of the ramp. FIGS. 18 to 21 show the results.

Figure 18:
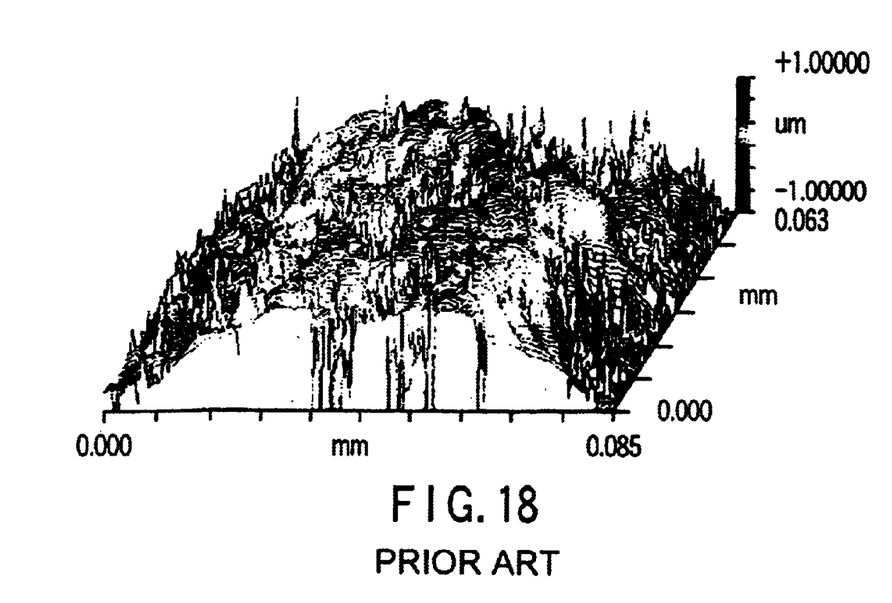
FIG. 18 shows the image data displayed on a display and representing the three dimensional shape of a conventional ramp contact portion.
Figure 19:
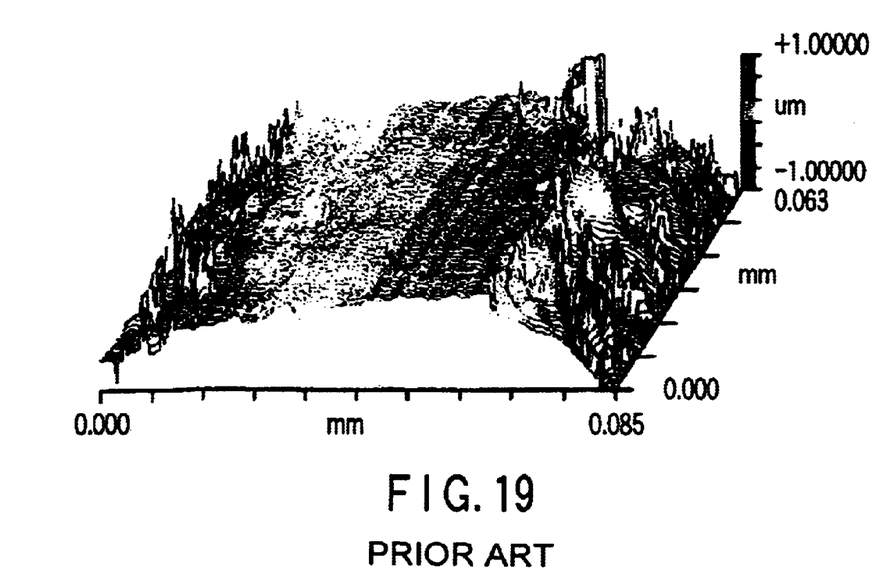
FIG. 19 shows the image data displayed on a display and representing the three dimensional shape of a conventional ramp contact portion.

As shown in FIGS. 18 and 19, it has been found that deformation was generated in, particularly, the contact portion after 50,000 times of the sliding test.

Figure 20:
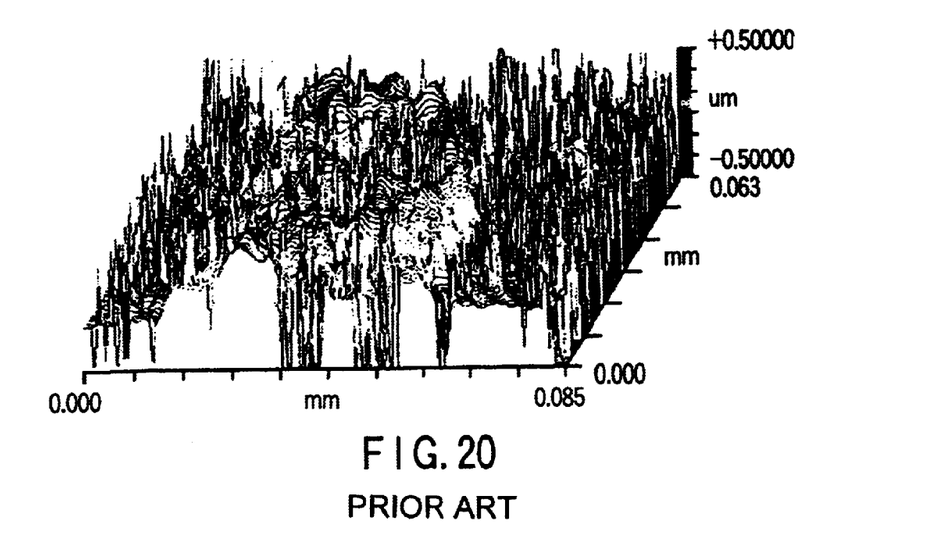
FIG. 20 shows the image data displayed on a display and representing the difference in the three dimensional shape between the image data shown in FIG. 19 and the image data shown in FIG. 18.
Figure 21:
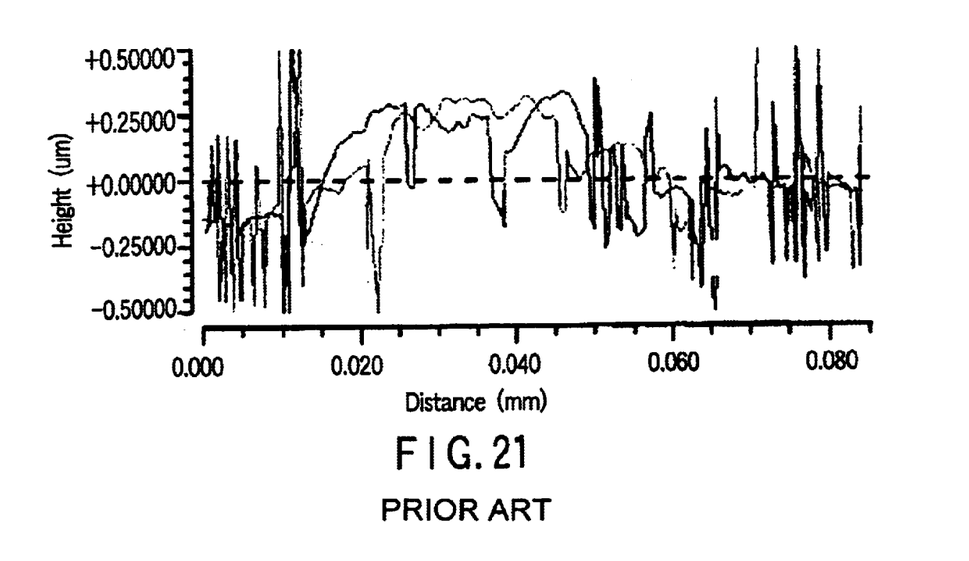
FIG. 21 shows the image data displayed on a display and representing a cross section of the image data shown in FIG. 20.

Also, as shown in FIGS. 20 and 21, the decreased amount was found to be larger than the increased amount, supporting that the resin was peeled off the ramp after the sliding test.

Further, the abrasion powder in the outer circumferential portion of the disc and the abrasion powder on the tab were observed with a microscope after 400,000 times of the sliding test, as in Example 1. As a result, a large amount of the abrasion powder was recognized on each of the outer circumferential portion of the disc and the tab. Table 1 shows the results.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

TABLE 1

|  | Example | Comparative Example 1 | Comparative Example 2 |
|---|---|---|---|
| Resin | Polyacetal | Aliphatic polyketone | PTFE-added liquid crystal polymer |
| Tensile elongation [%] ASTM D638 | 50 | 26 | 4.5 |
| Abrasion powder in outer circumferential portion of disc | ◯ | △ | X |
| Abrasion powder on tab | ◯ | ◯ | X |

What is claimed is:

1. A magnetic recording/reading apparatus comprising:
   a magnetic recording media:
   a head having a recording/reading element configured to record and read information in and from said magnetic recording media while positioned adjacent to said media; and
   a suspension assembly configured to support said head,
   a ramp positioned outside of said magnetic recording media, being in contact with a part of said suspension assembly to slidably support said suspension assembly and permit said head to be shunted outside the magnetic recording media during the non-recording/reading period
   wherein said ramp is made of a material having at least 30% of a tensile elongation, and the relationship represented by formulas (1) and (2) given below is satisfied:

$$b=a/3 \quad (1)$$

$$c \geq 0.0015a \quad (2)$$

where a represents a contact width of the contact portion between the ramp and a part of said suspension assembly as viewed from a cross section perpendicular to sliding direction of said suspension assembly, and c represents the distance in a vertical direction between a portion on a part of said suspension assembly apart from the edge of the contact portion by distance b and the surface of said ramp.

2. The magnetic recording/reading apparatus according to claim 1, wherein c in formula (2) is not larger than 0.1a.

3. The magnetic recording/reading apparatus according to claim 1, wherein said material is a polyacetal.

4. The magnetic recording/reading apparatus according to claim 1, wherein said material farther contains carbon.

5. A magnetic recording/reading apparatus comprising:
   a magnetic recording media;
   a head having a recording/reading element configured to record and read information in and from said magnetic recording media while positioned adjacent to said media; and
   a suspension assembly configured to support said head,
   a ramp positioned outside of said magnetic recording media, being in contact with a part of said suspension assembly to slidably support said suspension assembly and permit said head to be shunted outside the magnetic recording media during the non-recording/reading period
   wherein said ramp is made of a material having at least 30% of a tensile elongation, and the relationship represented by formulas (1) and (2) given below is satisfied:

$$b=a/3 \quad (1)$$

$$c \geq 0.015 \,\mu m \quad (2)$$

where a represents a contact width of the contact portion between the ramp and a part of said suspension assembly as viewed from a cross section perpendicular to sliding direction of said suspension assembly, and falls within a range of between 10 and 50 $\mu m$, and c represents the distance in a vertical direction between a portion on a part of said suspension assembly apart from the edge of the contact portion by distance b and the surface of said ramp.

6. The magnetic recording/reading apparatus according to claim 5, wherein said distance c in formula (1) falls within a range of between 0.015 $\mu m$ and 5 $\mu m$.

7. The magnetic recording/reading apparatus according to claim 5, wherein said magnetic recording media shapes like a disc being 2 cm to 15 cm in diameter.

8. The magnetic recording/reading apparatus according to claim 5, wherein said material is a polyacetal.

9. The magnetic recording/reading apparatus according to claim 5, wherein said material farther contains carbon.

* * * * *

UNITED STATES PATENT AND TRADEMARK OFFICE
CERTIFICATE OF CORRECTION

PATENT NO. : 6,667,858 B2
DATED : December 23, 2003
INVENTOR(S) : Takami

It is certified that error appears in the above-identified patent and that said Letters Patent is hereby corrected as shown below:

Title page,
Item [54], title, change "MAGNETIC RECORDING/READING APPARATUS" to
-- DISK DRIVE RAMP FOR SHUNTING A HEAD AWAY FROM A DISK MEDIUM AND FORMED FROM A MATERIAL HAVING A PARTICULAR TENSILE ELONGATION --.

Column 10,
Lines 25 and 65, change "farther" to -- further --.

Signed and Sealed this

Twenty-seventh Day of April, 2004

JON W. DUDAS
*Acting Director of the United States Patent and Trademark Office*